(12) United States Patent
van Rensburg et al.

(10) Patent No.: US 11,074,304 B2
(45) Date of Patent: Jul. 27, 2021

(54) SYSTEM AND METHOD FOR PUBLISHING AND DISPLAYING DIGITAL MATERIALS

(71) Applicant: Zovio Inc., San Diego, CA (US)

(72) Inventors: Wesley van Rensburg, San Diego, CA (US); Joe Barrus, San Diego, CA (US); Elizabeth Aguiar, Poway, CA (US); Erik Evans, San Diego, CA (US); Marc Riesenberg, Escondido, CA (US)

(73) Assignee: Zovio Inc., San Diego, CA (US)

( * ) Notice: Subject to any disclaimer, the term of this patent is extended or adjusted under 35 U.S.C. 154(b) by 137 days.

(21) Appl. No.: 16/244,063

(22) Filed: Jan. 9, 2019

(65) Prior Publication Data

US 2019/0163705 A1 May 30, 2019

Related U.S. Application Data

(63) Continuation of application No. 14/529,007, filed on Oct. 30, 2014, now Pat. No. 10,198,440, which is a
(Continued)

(51) Int. Cl.
*G06F 16/00* (2019.01)
*G06F 16/93* (2019.01)
(Continued)

(52) U.S. Cl.
CPC ............ *G06F 16/93* (2019.01); *G06F 16/285* (2019.01); *G06F 16/95* (2019.01); *G06F 16/951* (2019.01); *G06F 16/958* (2019.01); *G06F 40/169* (2020.01)

(58) Field of Classification Search
None
See application file for complete search history.

(56) References Cited

U.S. PATENT DOCUMENTS 6,195,667 B1 2/2001 Duga et al.
2002/0032693 A1 3/2002 Chiou
(Continued)

FOREIGN PATENT DOCUMENTS

JP 2004110691 A 4/2004
JP 2006244512 A 9/2006
(Continued)

OTHER PUBLICATIONS

Henderson, T., et al., "Using ePub as framework for the automated collection, tagging, and transformation of web content for corss-media publication," S&T/SPIR Electronic Imaging 2010, Imaging and Printing in a Web 2.0 World, Jan. 19, 2010 (Jan. 19, 2010), pp. 1-6, vol. 7540, San Jose, CA, USA.
(Continued)

*Primary Examiner* — Thu Nguyet T Le
(74) *Attorney, Agent, or Firm* — Sheppard Mullin Richter & Hampton LLP

(57) ABSTRACT

The present invention provides a system for publishing and displaying digital materials, comprising an ePub publishing module comprising a mechanism for publishers to upload ePub files, a user management module providing a means to add, edit and remove end users from the system, a bookshelf module for organizing the user's content in order to create a logical grouping of content, a reading content module for reading content after the user has been mapped to the content, and an annotating content module for annotating user selected text.

16 Claims, 15 Drawing Sheets

Related U.S. Application Data continuation of application No. 12/883,006, filed on Sep. 15, 2010, now Pat. No. 8,903,783.

(60) Provisional application No. 61/327,590, filed on Apr. 23, 2010.

(51) Int. Cl.
| | |
|---|---|
| *G06F 16/95* | (2019.01) |
| *G06F 16/28* | (2019.01) |
| *G06F 16/951* | (2019.01) |
| *G06F 16/958* | (2019.01) |
| *G06F 40/169* | (2020.01) |

(56) References Cited

U.S. PATENT DOCUMENTS

| | | | |
|---|---|---|---|
| 2002/0116293 A1* | 8/2002 | Lao | G06F 16/958 705/27.1 |
| 2003/0066884 A1 | 4/2003 | Reddy et al. | |
| 2003/0093382 A1 | 5/2003 | Himeno et al. | |
| 2003/0093385 A1 | 5/2003 | Vallee et al. | |
| 2003/0182578 A1 | 9/2003 | Warnock et al. | |
| 2004/0139400 A1* | 7/2004 | Allam | G06F 40/106 715/201 |
| 2004/0210483 A1 | 10/2004 | Watkins, III et al. | |
| 2005/0063612 A1 | 3/2005 | Manber | |
| 2005/0091109 A1 | 4/2005 | Howard et al. | |
| 2005/0223315 A1 | 10/2005 | Shimizu et al. | |
| 2006/0230340 A1 | 10/2006 | Parsons et al. | |
| 2007/0174122 A1 | 7/2007 | Howard et al. | |
| 2008/0022211 A1 | 1/2008 | Jones et al. | |
| 2008/0114729 A1 | 5/2008 | Raman et al. | |
| 2009/0094537 A1 | 4/2009 | Alber | |
| 2010/0122170 A1 | 5/2010 | Girsch et al. | |
| 2011/0164066 A1 | 7/2011 | Beals | |
| 2012/0198330 A1* | 8/2012 | Koppel | G06F 40/114 715/251 |

FOREIGN PATENT DOCUMENTS

| | | |
|---|---|---|
| JP | 2007102339 A | 4/2007 |
| JP | 2009223420 A | 10/2009 |

OTHER PUBLICATIONS

Yang et al., "Research and development of web-based virtual online classroom," Computers & Education, Amsterdam, Feb. 1, 2007 (Feb. 1, 2007), pp. 171-184. vol. 48, No. 2.
European Search Report in EP Application No. 2561435, dated Jul. 4, 2014, pp. 1-7.
Lam, "Usability and usefulness of eBooks on PPCs: How students' opinions vary over time," Feb. 2009, Australasian Journal of Educational Technology 2009, 25(1), 30-44.
Butler, Declan, "The Textbook of the Future CourseSmart," printed from Nature, vol. 458, pp. 568-580 (Apr. 2009).
PR Leap, "VitalSource Releases Groundbreaking e-Book Software Creating New Online Learning Networks," printed from www.prleap.com dated May 11, 2007.
Games Press, "Bookworm," printed from www.gamesindustry.biz on Nov. 30, 2009.
Adobe, "Adobe Technology Platform for RIAs Propels Innovation on the Web," San Jose Press Release dated Feb. 25, 2008.
Adobe, "Adobe Digital Editions 1.0 Now Available," San Jose Press Release dated Jun. 19, 2007.
Adobe, "Adobe Debuts Powerful InDesign CS4 Release," San Jose Press Release dated Sep. 23, 2008.
First Office Action in Chinese Patent Application No. 2011800205754, dated Dec. 2, 2014, pp. 1-2.
Office Action in Japanese Patent Application No. 20133-506167, dated Mar. 31, 2015, pp. 1-5.
Office Action in Canadian Patent Application No. 2,796,427, dated Jun. 7, 2016, pp. 1-3.
Second Office Action in Chinese Patent Application No. 201180020575.4, dated Jul. 23, 2015, pp. 1-2.
First Examination Report in Indian Patent Application No. 2691/KOLNP/2012, dated Dec. 7, 2018.
Third Office Action in Chinese Patent Application No. 201180020575.4, dated Dec. 30, 2015, pp. 1-2.
Fourth Office Action in Chinese Patent Application No. 201180020575.4, dated May 30, 2016, pp. 1-2.
First Office Action in Australian Patent Application No. 2011243114, dated Nov. 5, 2015.
International Search Report and Written Opinion in PCT/US2011/031355, dated Oct. 27, 2011.
International Preliminary Report on Patentability in PCT/US2011/031355, dated Oct. 23, 2012.

\* cited by examiner

SYSTEM AND METHOD FOR PUBLISHING AND DISPLAYING DIGITAL MATERIALS

CROSS-REFERENCE TO RELATED APPLICATIONS

This application is a continuation of U.S. patent application Ser. No. 14/529,007 filed Oct. 30, 2014, which is a continuation of U.S. patent application Ser. No. 12/883,006 filed Sep. 15, 2010, which claims the benefit of U.S. Provisional Patent Application Ser. No. 61/327,590 filed Apr. 23, 2010, which are hereby incorporated herein by reference in their entireties.

FIELD OF THE INVENTION

The present invention relates to systems and methods for publishing and displaying digital materials.

DESCRIPTION OF THE RELATED ART

There are several solutions on the market for either publishing digital course materials or displaying digital course materials, but no solutions that address both. Tools like Adobe's InDesign are configured to help one create materials for publication electronically, while tools like Adobe's Digital Editions, VitalSource, CourseSmart, and BookWorm are designed to display the publications. These systems are proprietary and require agreements with each entity. Moreover, they do not allow an institution to use one system to publish and display content in a relevant way.

One problem that exists with VitalSource and other conventional tools is that users are often forced to register with a system and create a user name and password. Another problem with conventional tools is the client download issue. Many of the readers (display of content) require a client download. This means a user has to download and install something in order to use the product. This is replete with issues including how many licenses a user gets.

Currently, there is no system in existence that offers an individual or institution the ability to: (i) load, publish and display content; (ii) create users from existing databases; (iii) be accessible from any browser; and (iv) employ the electronic publication (ePub) standard. ePub is a free and open e-book standard by the International Digital Publishing Forum (IDPF). In general, ePub is designed for reflowable content such that the text display can be optimized for the particular display device.

BRIEF SUMMARY OF EMBODIMENTS OF THE INVENTION

According to various embodiments of the invention, a system is provided for publishing and displaying digital materials. In some embodiments, the system comprises an ePub publishing module including a mechanism for publishers to upload ePub files, a user management module providing a means to add, edit and remove end users from the system, a bookshelf module for organizing the user's content in order to create a logical grouping of content, and a reading content module for reading content after the user has been mapped to the content.

In some embodiments, the system may further comprise (i) an annotating content module for annotating user selected text, (ii) a downloading center module for downloading content in a specific format to a specific device, (iii) a searching module for searching across content, or in a public library, for content that matches user selected search terms, (iv) a sharing module for sharing annotations and comments, and/or (v) a virtual content module for creating a virtual content item.

Further embodiments of the invention are directed toward a non-transitory computer readable medium having computer executable program code embodied thereon, the computer executable program code configured to cause a computing device to provide (i) an ePub publishing module comprising a mechanism for publishers to upload ePub files, (ii) a user management module providing a means to add, edit and remove end users from the system, (iii) a bookshelf module for organizing the user's content in order to create a logical grouping of content, and (iv) a reading content module for reading content after the user has been mapped to the content.

In some embodiments, the program code may be further configured to cause the computing device to (i) provide an annotating content module for annotating user selected text, (ii) cause the computing device to provide a downloading center module for downloading content in a specific format to a specific device, (iii) provide a searching module for searching across content, or in a public library, for content that matches user selected search terms, (iv) provide a sharing module for sharing annotations and comments, and (v) provide a virtual content module for creating a virtual content item.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

Figure 1:
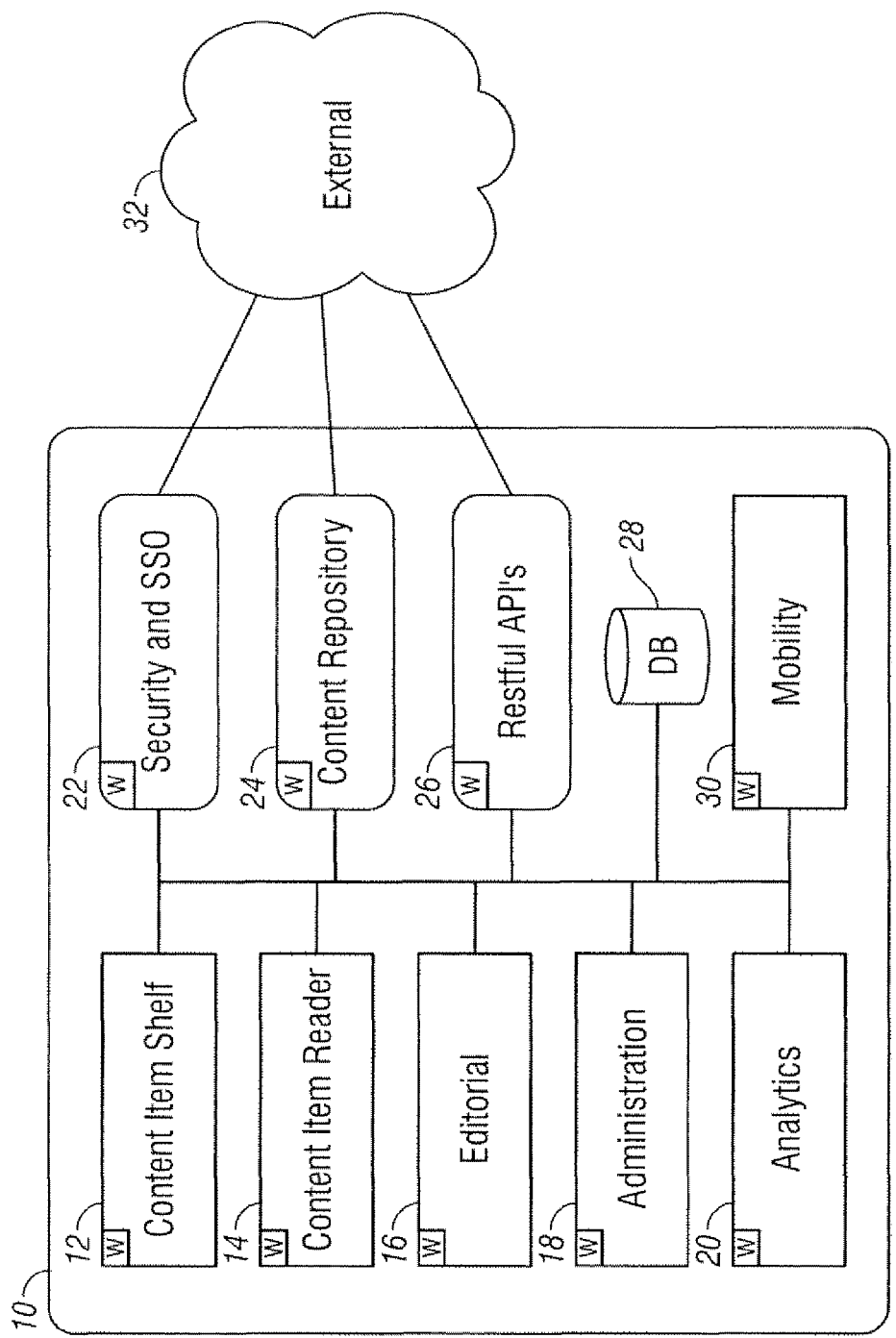
FIG. 1 is a platform diagram of an example system for publishing and displaying digital materials, in accordance with an embodiment of the invention.

These figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward systems and methods for publishing and displaying digital materials, for example, in a learning environment. The systems and methods set forth herein can include embedded audio, video, and Adobe Flash interactive applications within the reader experience. This enables the content to be better absorbed by auditory and visual learners than the standard "book" experience.

In some embodiments, the system offers several choices for users to access the learning materials outside of the core reader function. Such choices include: (i) a standard, static ePub file that can be accessed by any of the handheld readers which utilize this format; (ii) a static PDF which can be downloaded so that users can access content without an internet connection as well as a formatted, print-friendly version; and (iii) MP3 audio files that can be downloaded for users to access the materials as an audio book. In further embodiments, the system provides a web-based reader that allows users to add markup notation to the content through tools for highlighting, bookmarking and notation. The markup tools help the user mirror the ability to markup content as they would in a print textbook. Highlights and notes are saved and available for the user to access in a summary section.

Various systems and methods of the invention provide electronic delivery of "published" content to provide for greater flexibility and portability for the user learning environment based on each individual user's unique needs. Some embodiments provide the ability for consumers to annotate, mark up, and/or organize content electronically in a way that mimics traditional non-digital form and practices, and provides additional capabilities not available in a traditional non-digital form. In addition, some embodiments provide an increased ability to aggregate or separate content to maximize relevancy to the context of the delivery. This allows publishers to creatively define unique content by aggregating disparate pieces of content from a variety of sources into a single delivery (e.g., virtual books). This also allows for individual pieces of content to be delivered to the customer based on the context of the demand. This further allows for real-time dynamic assembly and delivery of relevant content based on the context of the demand.

An additional aspect of the systems and methods for publishing and displaying digital materials set forth herein includes a reduced time to market for published content to availability for delivery. In many cases, the time to market can be reduced to such extent that it can meet or nearly meet the definition of real-time. Certain embodiments further provide ease of integration into various disparate operating environments and consuming or producing systems.

The above-described features can enable publication and delivery of highly relevant content based on a dynamically changing demand context of the consumer (system or person) in real or near real-time. This, in turn, can support innovative and creative learning solutions, e.g., integrating into an online study hall. In such an example, the library may listen in and offer up snippets or full content items to the study hall participants based on a changing context of the study hall conversation. In addition, a publisher could be part of the conversation, publish content and make it available immediately for integration into this and other conversations.

As set forth above, there is currently no system in the market that offers an individual or institution the ability to: (i) load, publish and display content; (ii) create users from existing databases; (iii) be accessible from any browser; and (iv) employ the ePub standard. The various embodiments of the invention solve this problem. In addition, the systems and methods described herein provide an institution the ability to automatically create user accounts for users within the institution. In some embodiments, the system/method is fully integrated with a Campus Management module allowing users to be pulled and created from existing data. By way of example, when a student is registered in a college associated with the systems and methods set forth herein, they are automatically registered with the Campus Management module. As such, an opportunity is afforded to seamlessly pull users from the college into the Campus Management module.

Using the system, an institution, author, or publisher can upload content via the ePub standard. The system indexes the material and displays it to one's readers/users in a meaningful way with a table of contents. Furthermore, the content will be searchable and will offer the user the ability to highlight, take notes and make bookmarks. This provides users with a "one stop shop" for their publication, display and user creation needs.

Another problem with conventional tools is the client download issue, wherein a user has to download and install something in order to use the product. This is replete with issues including how many licenses a user gets. The systems described herein are browser-based and do not require a download; accordingly, users can access published materials from any computer with a browser and internet connectivity, anywhere and at any time.

The systems and methods of the invention use the ePub standard. Consequently, they are digital rights management (DRM) free such that users can interact with the materials in ways they prefer. DRM comprises access control technology that may be employed to impose limitations on the use of digital content and devices. Because the systems and methods of the invention are DRM-free, users may download and save, print, and send content to a mobile device like a Kindle or iPhone. By employing the ePub standard, it is very easy to repurpose the content for other online uses like mobile applications.

According to various embodiments of the invention, the systems and methods may be employed to: (i) publish, download, print, send to a mobile device and manage user database for any publishable item including documents, spreadsheets, books, magazines, etc.; (ii) communicate with any user base; (iii) grow and share collaborative communities; (iv) customize, publish and share material with others; and (v) publish digital offerings.

FIG. 1 is a platform diagram of an example system for publishing and displaying digital materials, in accordance with an embodiment of the invention. The illustrated system platform 10 comprises various components including content item bookshelf 12, content item reader 14, editorial application 16, administration application 18, analytics 20, security and single sign-on (SSO) 22, content repository 24, public RESTful application programming interfaces (APIs) 26, database 28 and mobility application 30. The security and SSO 22, content repository 24, and public RESTful APIs 26 are in communication with an external system 32.

A software application may reside on various components of the system platform 10, the software application comprising computer executable program code storable on a non-transitory computer readable medium, the computer executable program code configured for performing various functions. In particular, the software application includes an electronic publication (ePub) publishing module comprising a mechanism for publishers to upload ePub files. During the upload process, the publisher may also choose to upload supporting content such as audio files, video files, Portable Document Formats (PDFs), addendums, and content in various other formats. According to some embodiments, each ePub file goes through an indexing process to support full-text search. The file may then be broken down into a new structure that allows for easy web loading. The publisher can then choose when to publish their content, thereby making the content visible in the public bookshelf.

The software application may further comprise a user management module. In some embodiments, the user management module can provide three ways to add/edit/remove end users from the system. First, an administrator can manually add/edit/remove end users using a "User Management" interface. Second, an administrator may configure the platform 10 to use an external user management system 32 such as Lightweight Directory Access Protocol (LDAP). Third, the administrator may elect to integrate through the system's public RESTful APIs 26.

The software application also comprises a bookshelf module. In operation, an end user's first entry point into the system takes them to the bookshelf. By default, the end user will have one bookshelf or shelf when initially entering the system. The user can also create more shelves to organize his or her content at any time in order to create a logical grouping of content. When searching for public content, an end user will need to perform a "check out" in order to move content to one of the shelves. Once a "check out" has been performed, the end user can interact with the content in various ways including, but not limited to, reading content, annotating content, downloading content, printing content, and searching within content.

In some embodiments of the invention, the software application may further comprise a reading content module. In general, an end user can only read content once they have been "mapped" to the content. Mapping is essentially binding a user to an instance on the content, which can be achieved in one of two ways. The first option occurs when a user "checks out" content to a selected bookshelf. The second option is through a public RESTful API 26. The mapping process allows the end user to read the content.

The software application may further comprise an annotating content module. When reading the content, the end user may choose to annotate the content. There are three different types of annotations: (i) Highlights, (ii) Notes, and (iii) Bookmarks.

An end user can select text, and then choose to annotate the selected text. The end user also has the option of selecting an annotation color. Once annotated, the end user has a visual clue in the content and in the summary section, which provides the user with the capabilities of managing the annotation (e.g., removing and editing the annotation).

The software application may further comprise a downloading center module. An end user may choose to download content in a specific format to a specific device. The format is generally decided during a publishing process when the publisher uploaded the content. The end user is able to either select one of the publisher's formats, the original ePub format, or selectable sections from the content in ePub form. Once the format has been selected, the end user may select a device for downloading. The system may support various kinds of devices, including, but not limited to: (i) the end user's PC, (ii) Amazon Kindle Sony Reader, (iii) iPhone, (iv) iPad, and (v) various other devices. The system may provide the end user with a step-by-step wizard for enabling a trouble free download.

According to some embodiments, the software application further comprises a searching module, whereby an end user can perform two types of searches. The first type comprises searching across content, or in the public library, for content that matches the search terms. The second type comprises searching within a specific content, which provides anchor links for the end user to interact with the search results and view them when clicked. Searching can also include related content such as annotations, shared content, and supporting content.

The software application may further comprise a sharing module, whereby an end user can choose to share the annotations and comments he or she made with respect to the content. The end user can also choose sharing properties such as audience, permissions, and other selected properties. All shared content will become available in the public bookshelf.

In some embodiments, the software application may further comprise a virtual content module. The system provides the capability to create a virtual content item. An end user can select parts of different content items into one virtual content item. The virtual content item can then be placed onto an end user's bookshelf for easy access.

According to various embodiments described herein, the standards employed may include, but are not limited to, Open Publication Structure (OPS) 2.0 v1.0, Open Packaging Format (OPF) 2.0 v1.0, and OEBPS Container Format (OCF) 1.0.

Figure 2:
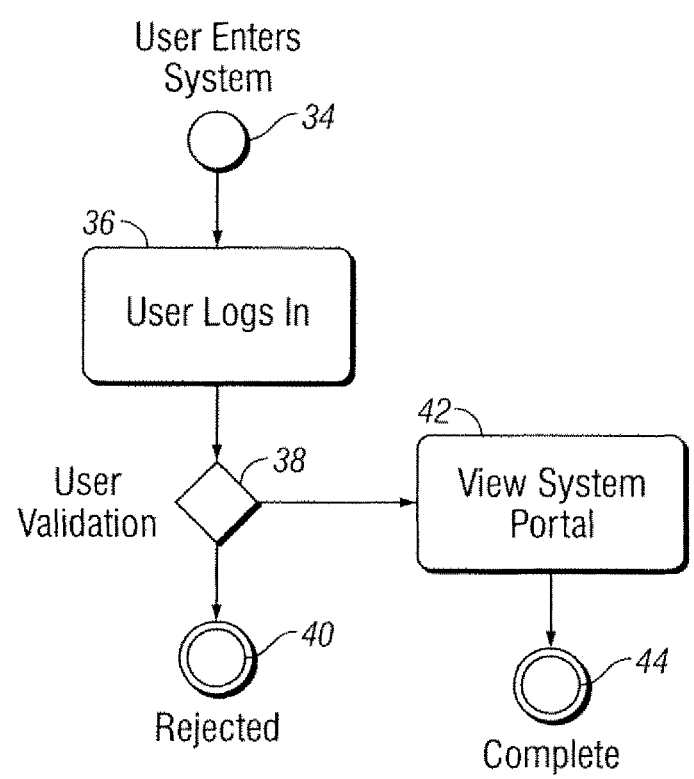
FIG. 2 is an activity diagram illustrating a method for accessing the system for publishing and displaying digital materials, in accordance with an embodiment of the invention.

FIG. 2 is an activity diagram illustrating a method for accessing the system for publishing and displaying digital materials, in accordance with an embodiment of the invention. The user enters the system in step 34 and logs in step 36. User validation occurs in step 38, wherein the user is either rejected (step 40) or accepted such that that user may view the system portal 10 in step 42. The method is complete at step 44 after the user is finished accessing the system portal 10.

Figure 3:
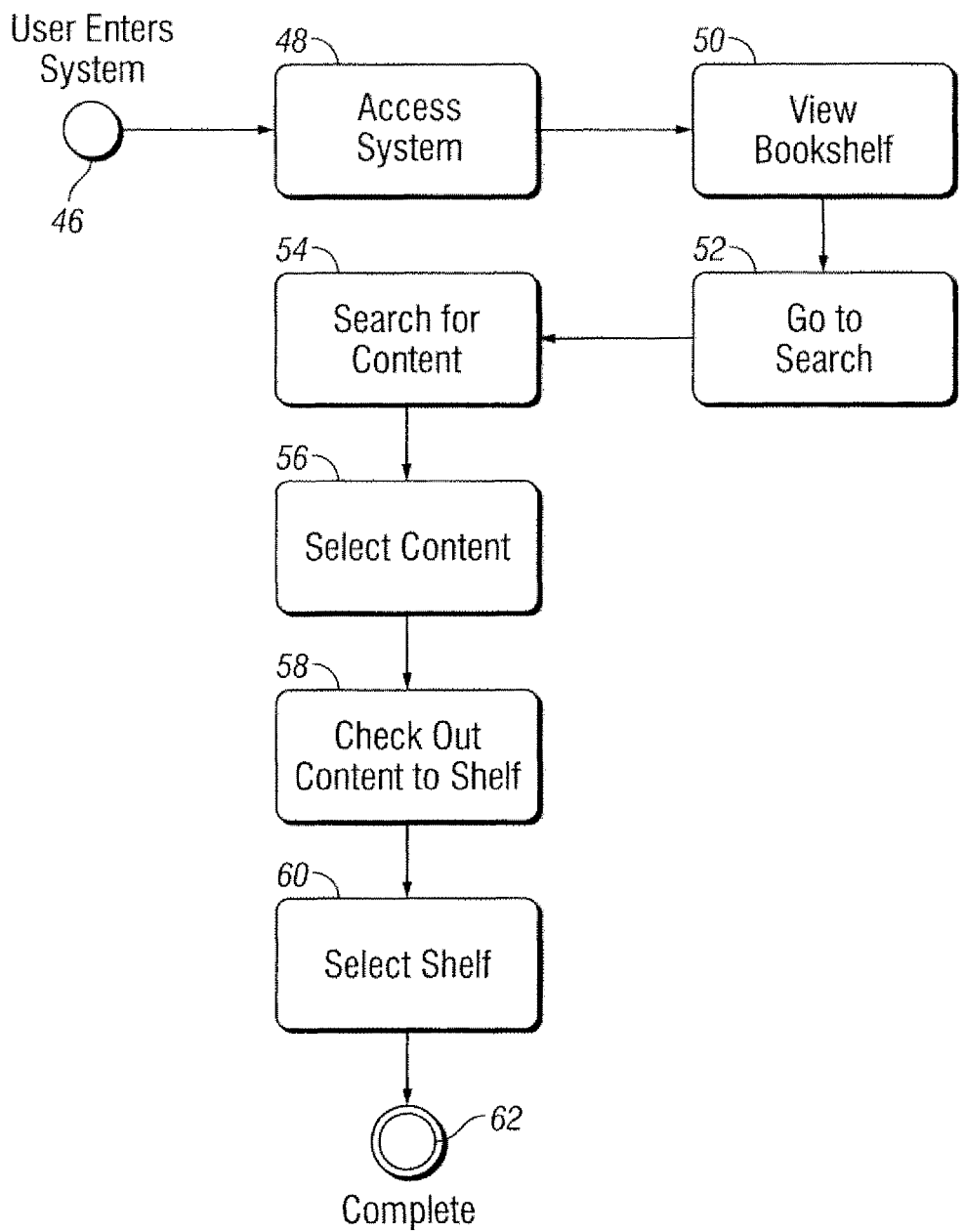
FIG. 3 is an activity diagram illustrating a method for finding content on a bookshelf, in accordance with an embodiment of the invention.

FIG. 3 is an activity diagram illustrating a method for finding content on a bookshelf, in accordance with an embodiment of the invention. The user enters the system in step 46 and accesses the system in step 48. Step 50 involves the user viewing a bookshelf. In step 52, the user selects the search option, while in step 54 the user searches for content, and in step 56 the user selects the content. By way of example, content may include books, audio, notes, etc. Step 58 involves selecting content to be "checked out," whereas step 60 involves selecting the shelf to which the content will be moved. The method is complete at step 62 after the user has selected the shelf.

Figure 4:
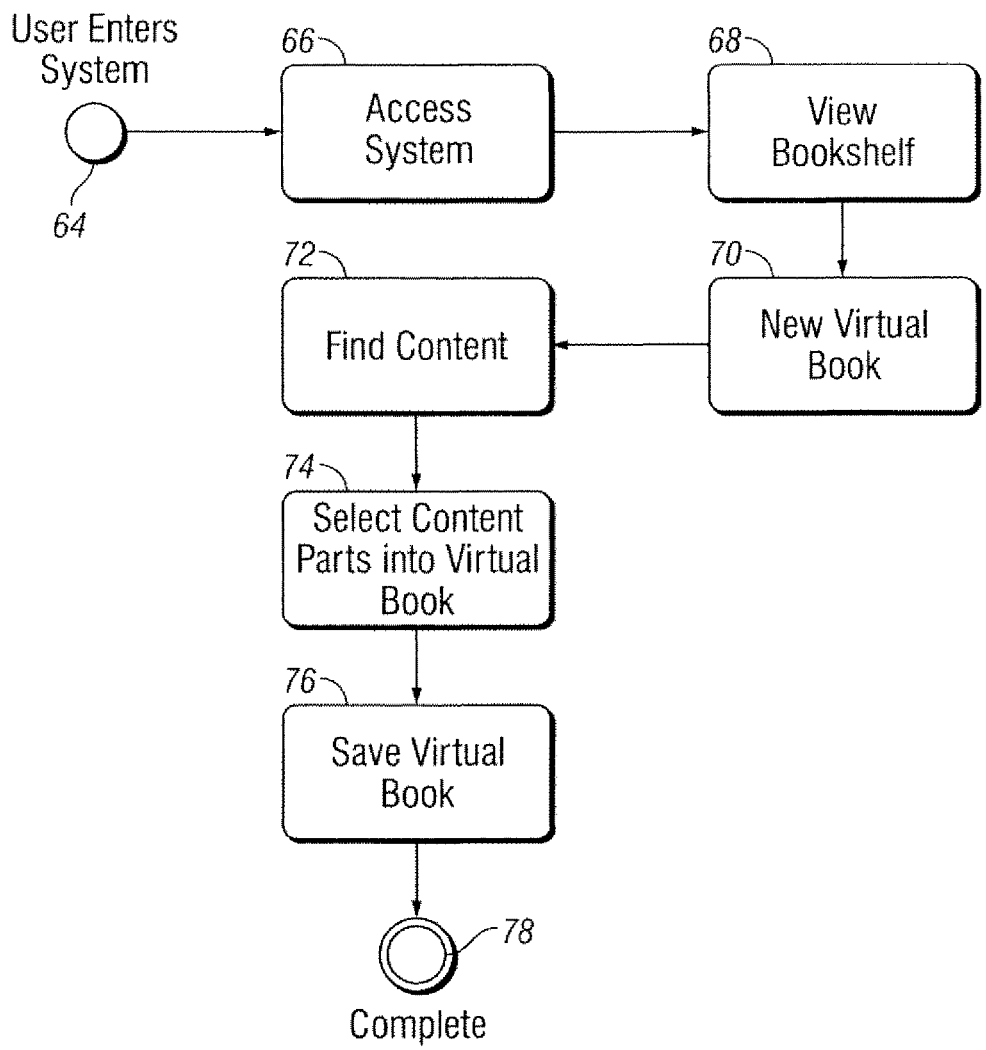
FIG. 4 is an activity diagram illustrating a method for creating and saving a virtual book on a bookshelf, in accordance with an embodiment of the invention.

FIG. 4 is an activity diagram illustrating a method for creating and saving a virtual book on a bookshelf, in accordance with an embodiment of the invention. The user enters the system in step 64 and accesses the system in step 66. Step 68 involves the user viewing a bookshelf. In step 70, the user selects a new virtual book, which may comprise a virtual grouping of content that facilitates reading and organizing. In step 72, the user finds content, while step 74 involves the user selecting content parts into the virtual book. Such content parts may comprise whole books, notes, or selected chapters. Step 76 involves saving the virtual book, after which time the method is complete at step 78.

Figure 5:
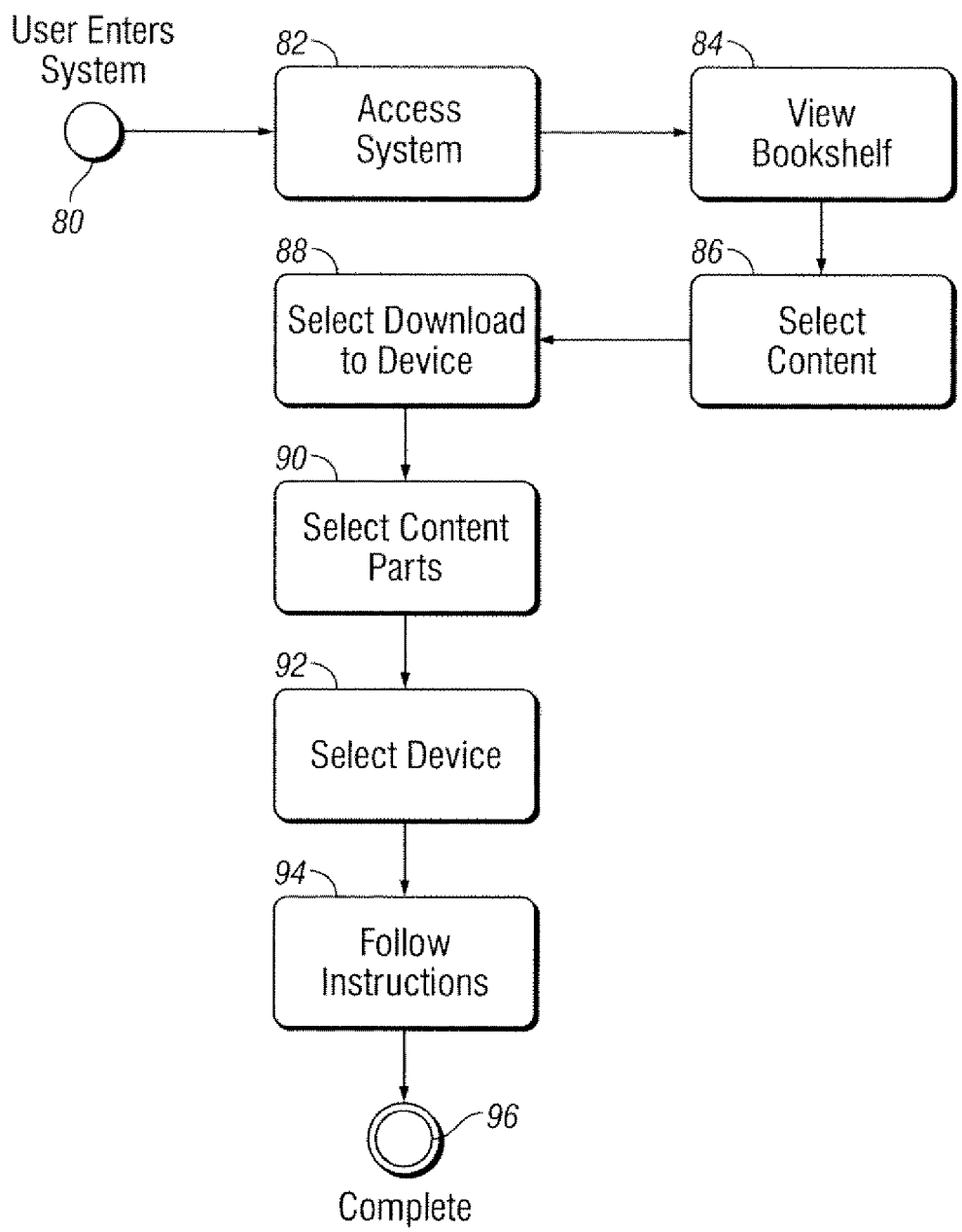
FIG. 5 is an activity diagram illustrating a method for downloading content from a bookshelf to a device, in accordance with an embodiment of the invention.

FIG. 5 is an activity diagram illustrating a method for downloading content from a bookshelf to a device, in accordance with an embodiment of the invention. The user enters the system in step 80 and accesses the system in step 82. Step 84 involves the user viewing a bookshelf and step 86 involves the user selecting content. For example, content may include books, audio, notes, etc. In step 88, the user selects a download for a device, which may comprise any mobile reader or device. The user selects the content parts (e.g., whole books, notes, or selected chapters) in step 90 and selects the device in step 92. Step 94 involves the user following downloading instructions. The method is complete at step 96.

Figure 6:
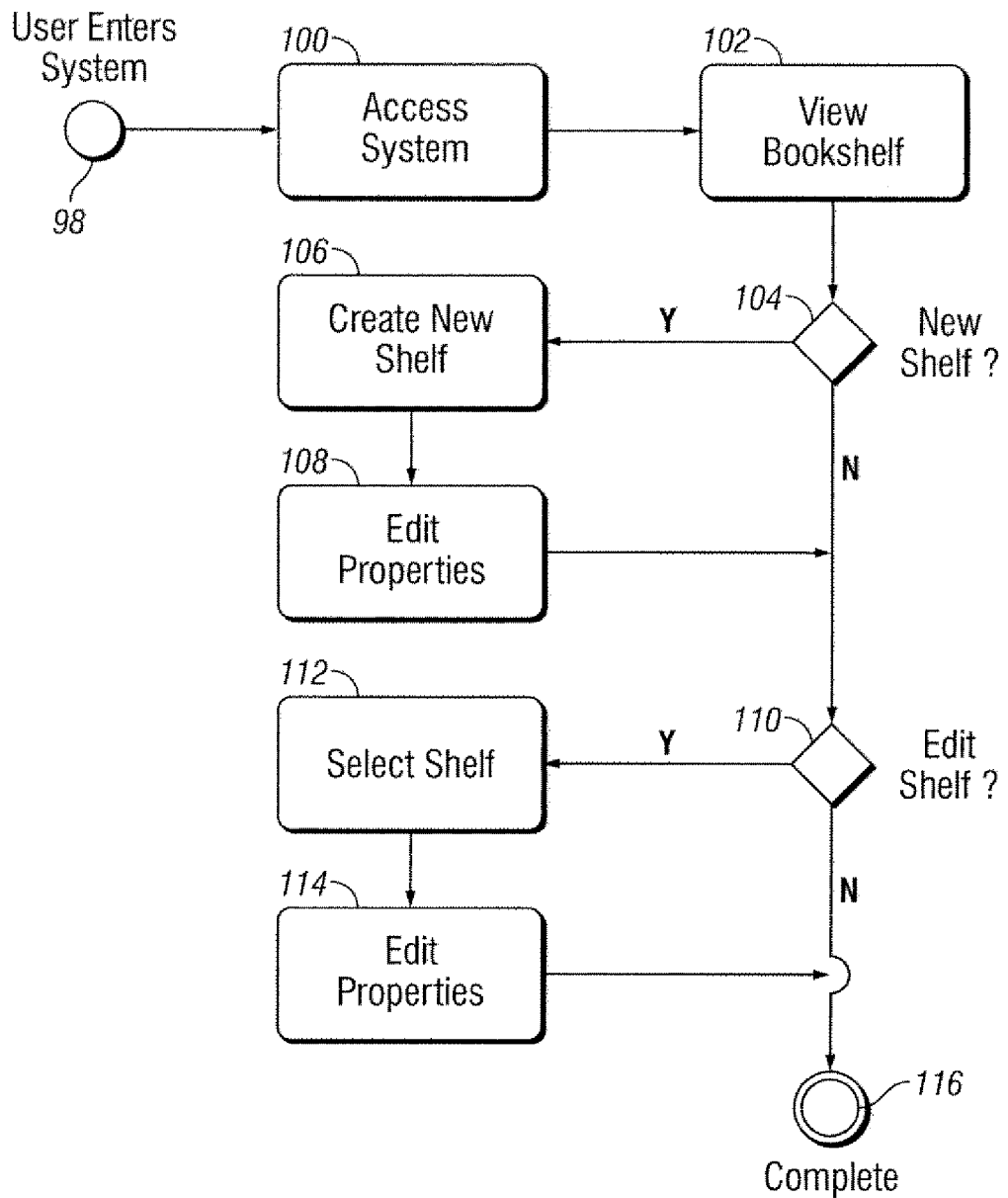
FIG. 6 is an activity diagram illustrating a method for managing the shelves on a bookshelf, in accordance with an embodiment of the invention.

FIG. 6 is an activity diagram illustrating a method for managing the shelves on a bookshelf, in accordance with an embodiment of the invention. The user enters the system in step 98 and accesses the system in step 100. Step 102 involves the user viewing a bookshelf. In step 104, the software determines whether the bookshelf is new. If not, the method proceeds to step 110. If the shelf is new, the method proceeds to steps 106 and 108, which involve creating a new shelf and editing its properties, respectively. In step 110, the user determines whether to edit the bookshelf. If not, the method proceeds to completion at step 116. If the bookshelf is to be edited, the method proceeds to steps 112 and 114, which entail selecting a shelf and editing its properties, respectively. The method is then complete at step 116.

Figure 7:
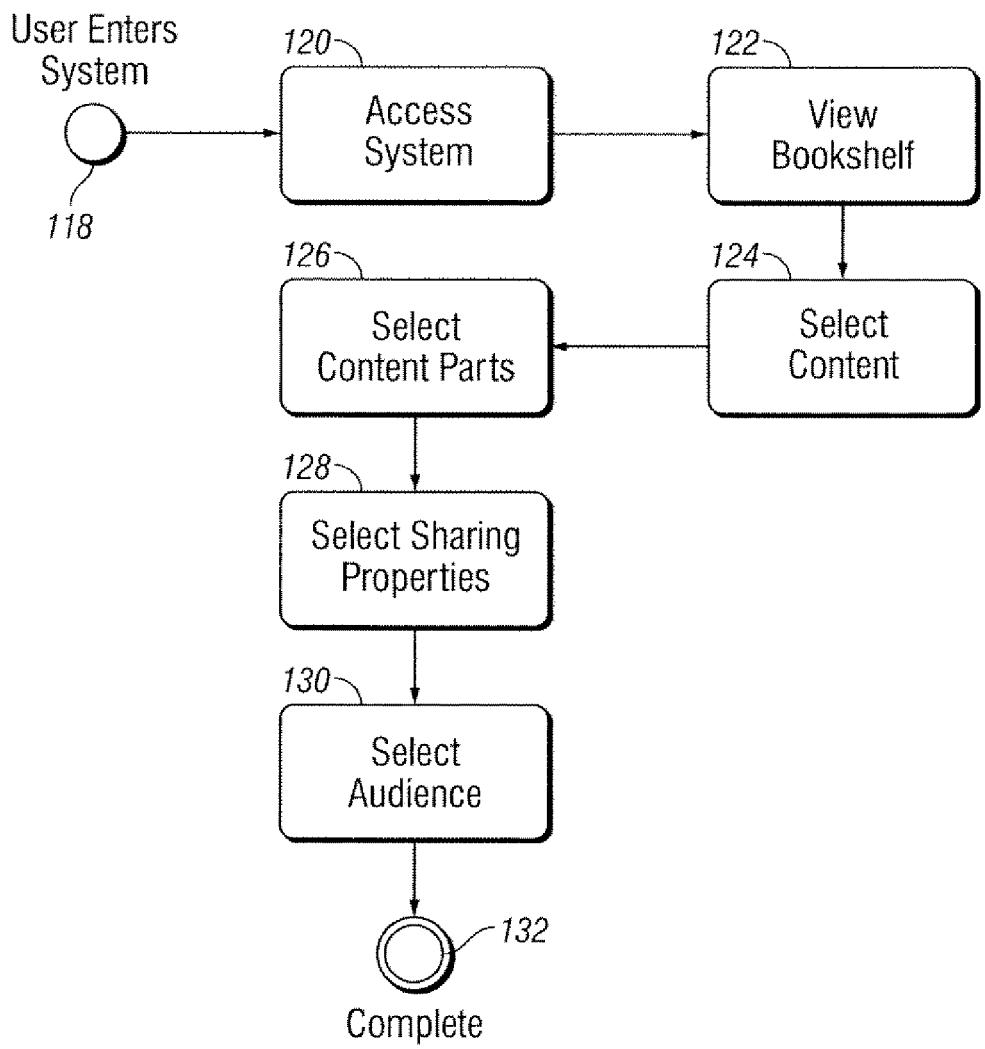
FIG. 7 is an activity diagram illustrating a method for sharing content of a bookshelf, in accordance with an embodiment of the invention.

FIG. 7 is an activity diagram illustrating a method for sharing content of a bookshelf, in accordance with an embodiment of the invention. The user enters the system in step 118 and accesses the system in step 120. Step 122 involves the user viewing a bookshelf and step 124 involves the user selecting content. The content may include any content "checked out" to the bookshelf such as books, virtual books, audio, notes, etc. The user selects the content parts (e.g., whole books, notes, or selected chapters) in step 126 and selects the sharing properties in step 128. Step 130 involves the user selecting the audience. The method is complete at step 132.

Figure 8:
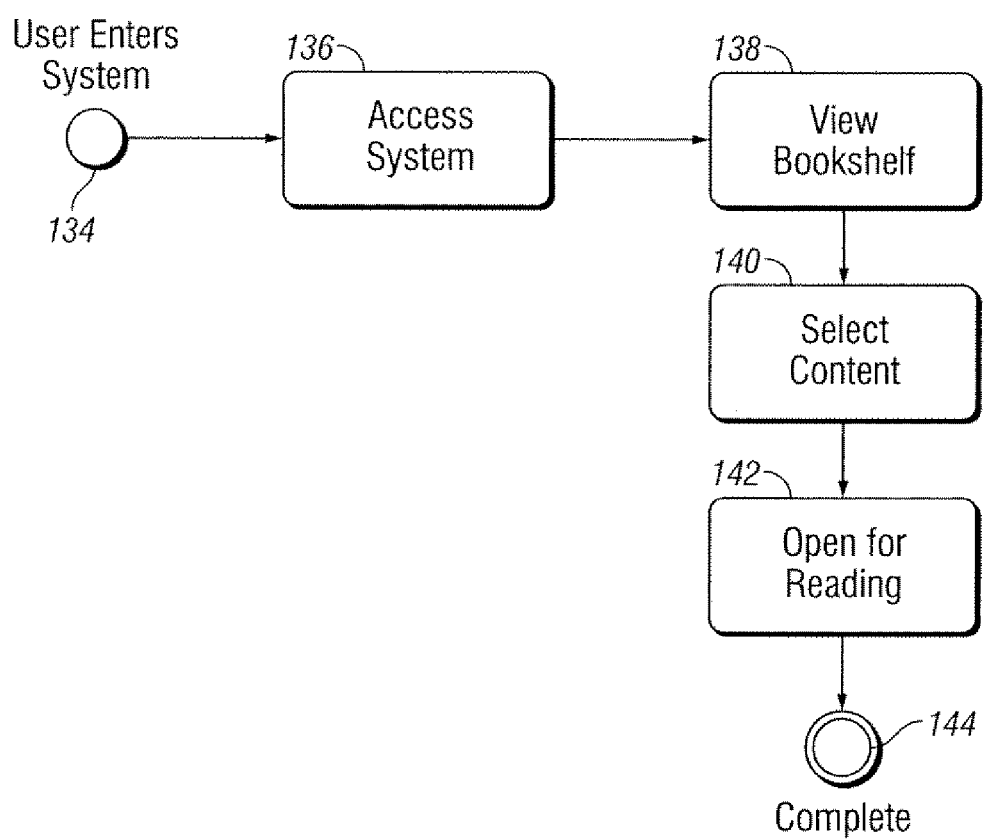
FIG. 8 is an activity diagram illustrating a method for reading the content of a bookshelf, in accordance with an embodiment of the invention.

FIG. 8 is an activity diagram illustrating a method for reading the content of a bookshelf, in accordance with an embodiment of the invention. The user enters the system in step 134 and accesses the system in step 136. Step 138 involves the user viewing a bookshelf and step 140 involves the user selecting content. As set forth above, content may include any content "checked out" to the bookshelf such as books, virtual books, audio, notes, etc. The user opens the content for reading in step 142. The method is complete at step 144.

Figure 9:
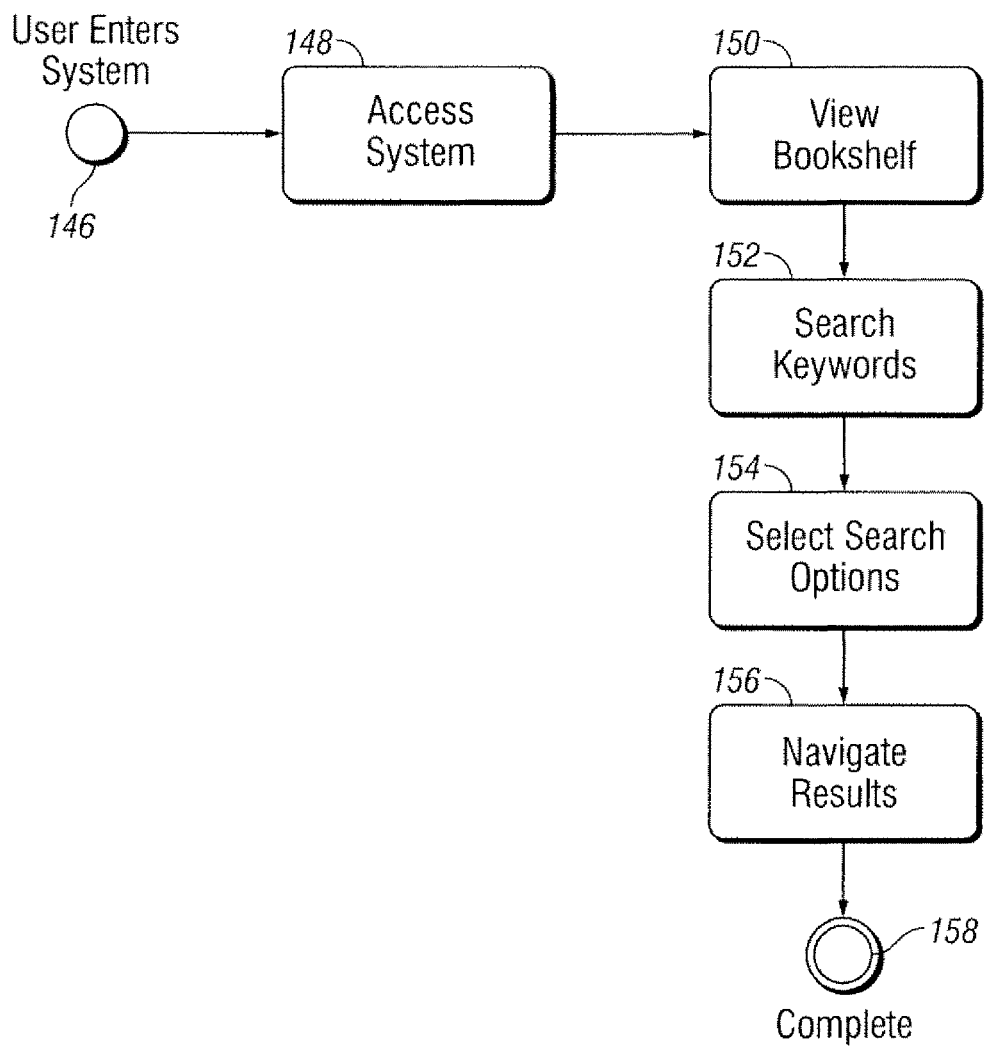
FIG. 9 is an activity diagram illustrating a method for searching across a bookshelf, in accordance with an embodiment of the invention.

FIG. 9 is an activity diagram illustrating a method for searching across a bookshelf, in accordance with an embodiment of the invention. Searching across a shelf generally entails searching across all digital materials, like doing a federated search. The user enters the system in step 146 and accesses the system in step 148. Step 150 involves the user viewing a bookshelf. Step 152 involves the user searching keywords, while step 154 involves the user selecting search options. By way of example, search options may include searching opened content only, or searching the entire content. In step 156, the user navigates the search results. The method is complete at step 158.

Figure 10:
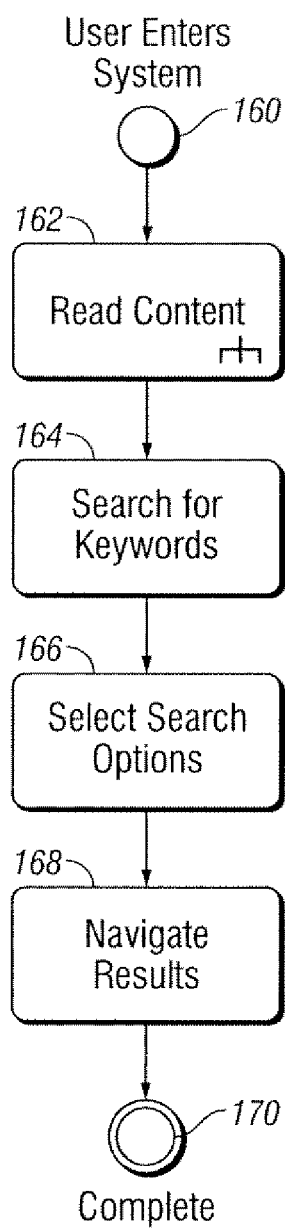
FIG. 10 is an activity diagram illustrating a method for searching within the content of a bookshelf, in accordance with an embodiment of the invention.

FIG. 10 is an activity diagram illustrating a method for searching within the content of a bookshelf, in accordance with an embodiment of the invention. Searching within the content of a bookshelf generally entails searching within a specific digital material (i.e., within the reader). The user enters the system in step 160 and reads content in step 162. Step 164 involves the user searching for keywords, while step 166 involves the user selecting search options. As stated, search options may include searching opened content only, or searching the entire content. In step 168, the user navigates the search results. The method is complete at step 170.

Figure 11:
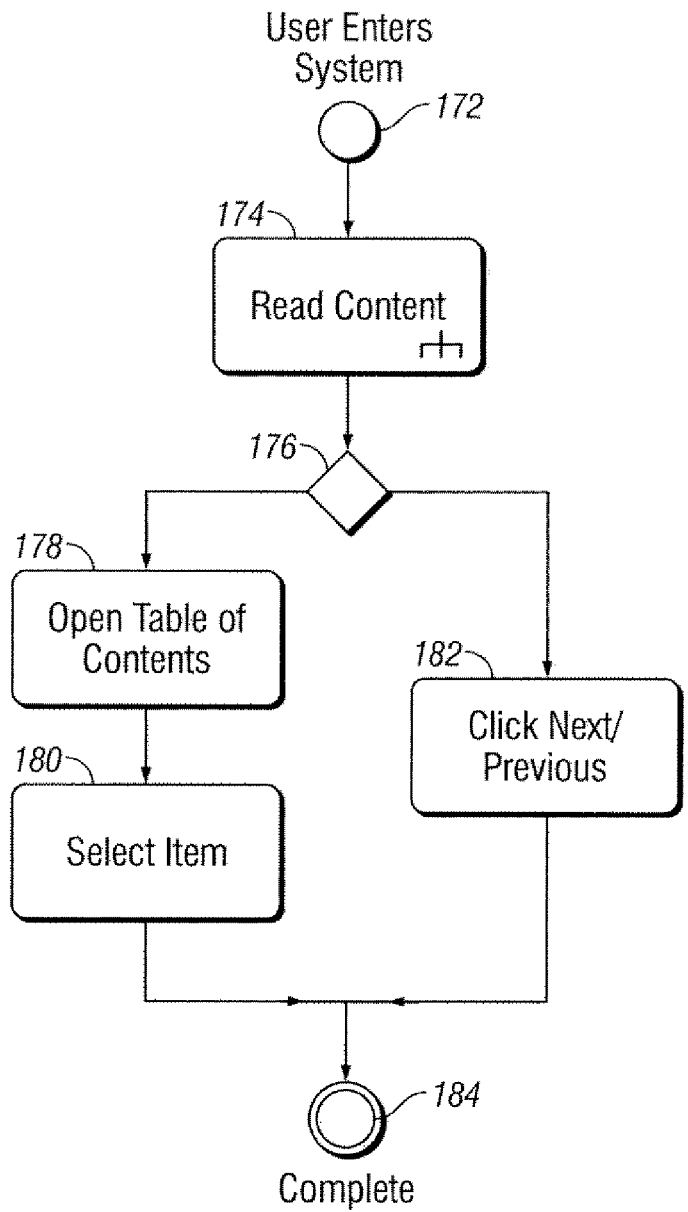
FIG. 11 is an activity diagram illustrating a method for navigating content within a bookshelf, in accordance with an embodiment of the invention.

FIG. 11 is an activity diagram illustrating a method for navigating content within a bookshelf, in accordance with an embodiment of the invention. The user enters the system in step 172 and reads content in step 174. In step 176, the user determines whether to open the table of contents (step 178) and select an item (step 180), or to click next/previous (step 182). The method is complete at step 184.

Figure 12:
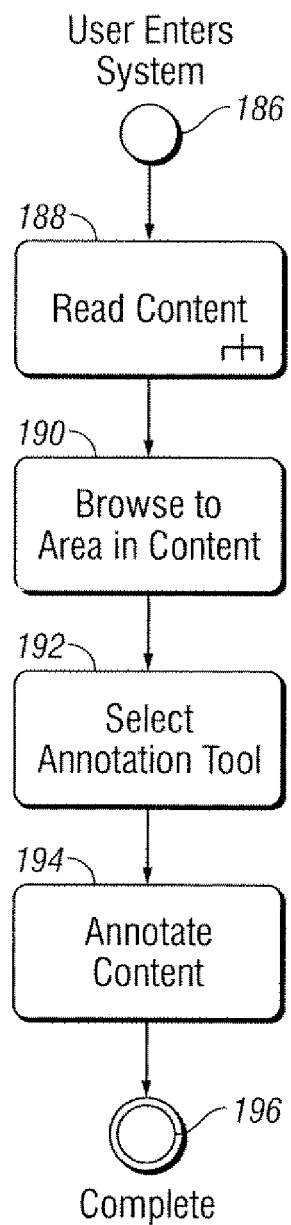
FIG. 12 is an activity diagram illustrating a method for annotating content of a bookshelf, in accordance with an embodiment of the invention.

FIG. 12 is an activity diagram illustrating a method for annotating content of a bookshelf, in accordance with an embodiment of the invention. The user enters the system in step 186 and reads content in step 188. In step 190, the user browses to an area in the content. Step 192 involves the user selecting an annotation tool, whereas step 194 involves the user annotating the content, for example, by adding highlights, notes and/or bookmarks. The method is complete at step 196.

Figure 13:
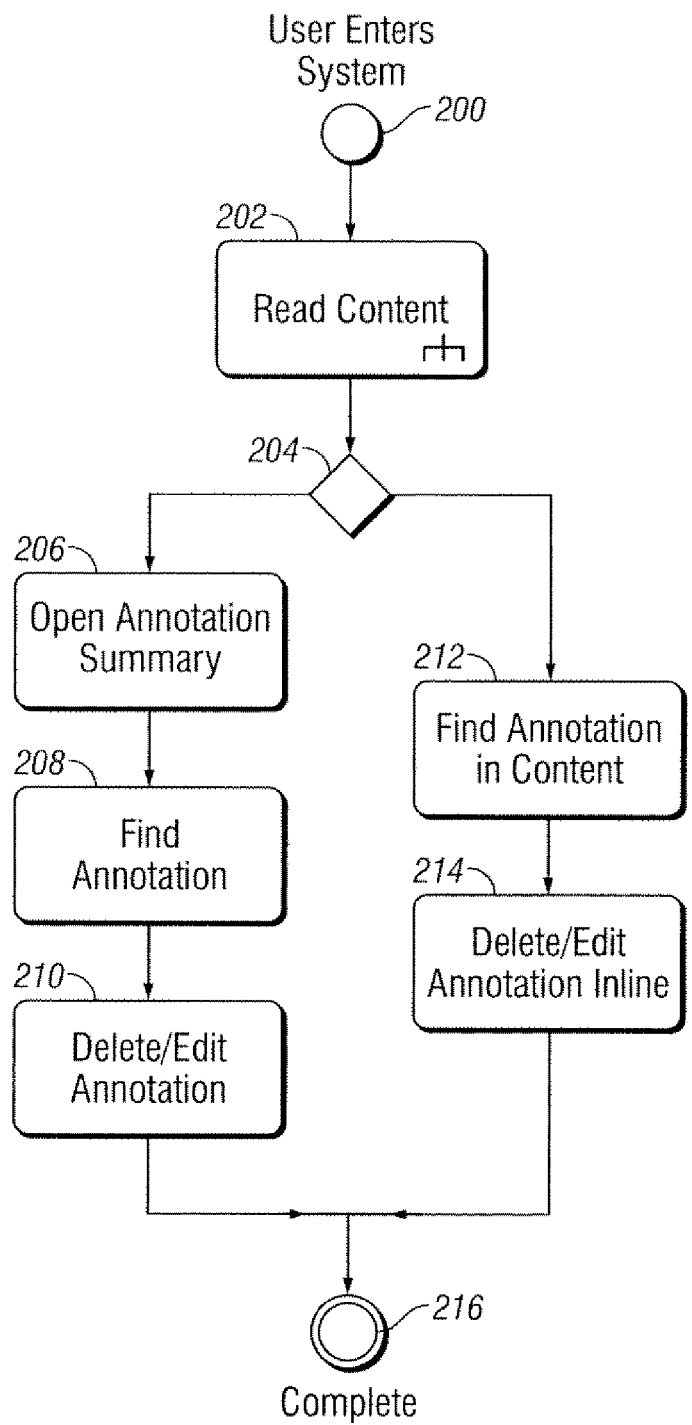
FIG. 13 is an activity diagram illustrating a method for managing annotations to the content of a bookshelf, in accordance with an embodiment of the invention.

FIG. 13 is an activity diagram illustrating a method for managing annotations to the content of a bookshelf, in accordance with an embodiment of the invention. The user enters the system in step 200 and reads content in step 202. In step 204, the user determines whether to (i) open an annotation summary (step 206), find an annotation (step 208), and delete/edit the annotation (step 210), or (ii) find an annotation in the content (step 212) and delete/edit the annotation inline (step 214). The method is complete at step 216.

Figure 14:
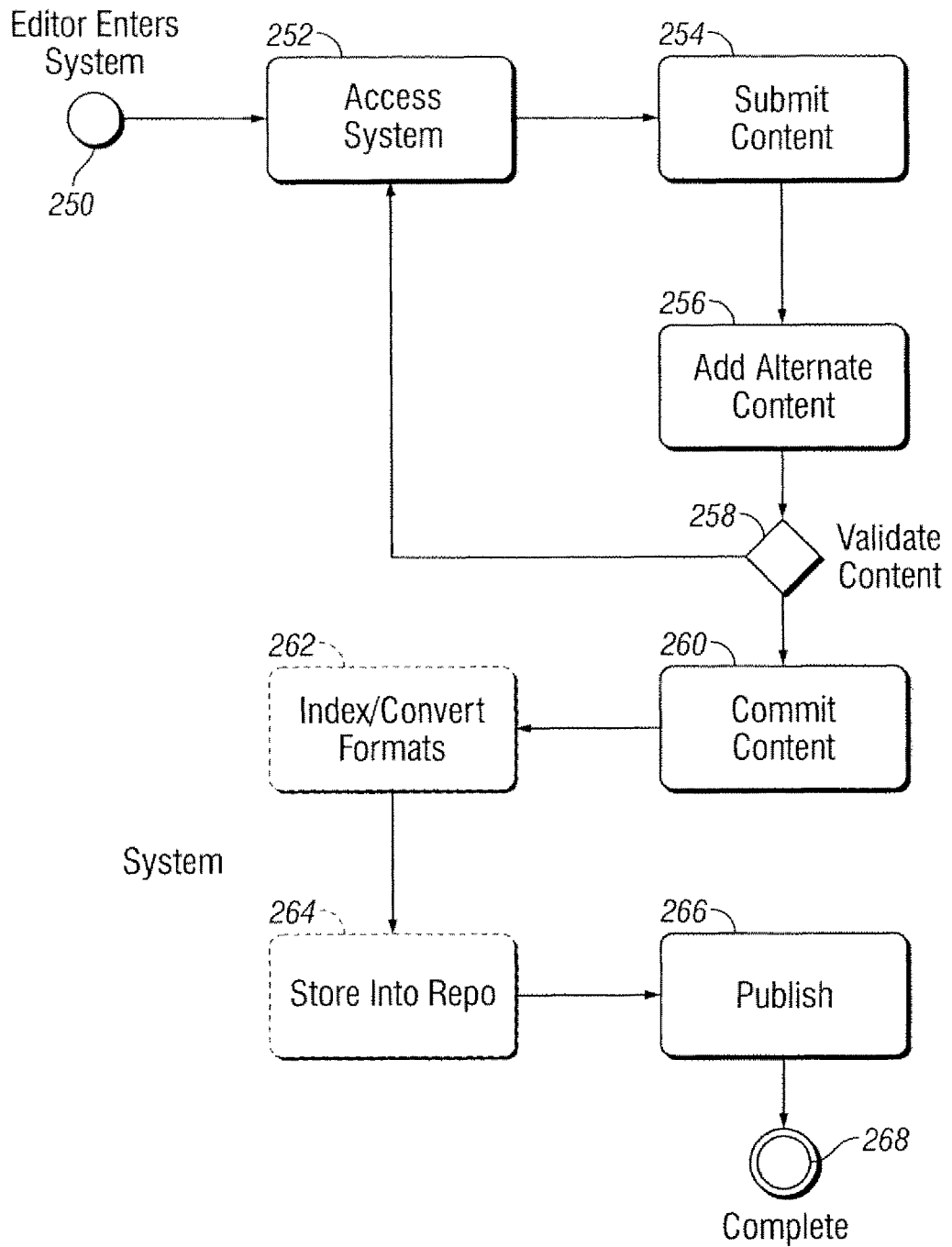
FIG. 14 is an activity diagram illustrating a method for editing the content of a bookshelf, in accordance with an embodiment of the invention.

FIG. 14 is an activity diagram illustrating a method for adding content to a bookshelf, in accordance with an embodiment of the invention. The user enters the system in step 250 and accesses the system in step 252. Step 254 involves the user submitting content (i.e., digital content) and step 256 involves the user adding alternative content (e.g., other formats, an audio version, supporting content, etc. In step 258, the system attempts to validate the content. If the content cannot be validated, the method moves back to step 252. If the content is validated, the method proceeds to step 260, which entails committing the content. In steps 262 and 264, the system indexes/converts the formats and stores the data into repository, respectively. Step 266 involves publishing the content. The method is complete at step 268.

The systems described herein include primary instructional digital materials for course reading assignments and activities, a browser-based reader to display digital content, and integration with college systems and student portals. The digital materials may be displayed on a variety of devices—including MP3 players and PDAs—and may be designed with students and academic outcomes in mind. As discussed below, such systems solve several problems and create a number of opportunities.

The systems provide a cost savings to students because the digital instructional materials replace print textbooks published by third parties. Digital materials eliminate costs associated with physical inventory and shipping. The systems of the invention may also avoid the constraints of licensing digital content from third parties. Third parties are typically very concerned about piracy of their digital materials such that they compensate by incorporating digital rights management (DRM) into their products. DRM usually limits the number of installations and restricts the print function. Also, since publishers do not see digital content as a major source of revenue, they do not invest much in features and functionality.

In some embodiments of the invention, the digital materials are developed on a work-for-hire basis such that the copyrights are owned by the university engaging the content developers. This allows the university to control the revision cycle so that they no longer have to update materials simply because a third party decides it is time to roll out a new edition. As such, the university can correct and revise in its discretion, as and when needed or appropriate.

Various embodiments of the invention are based upon an ownership model for digital materials. By contrast, most digital content is licensed, not owned. According to embodiments where digital content is associated with an ownership model, users/students pay a one-time fee and may use the content any way, any time, and in as many variations as they wish. The adoption of ePub as the standard for document conversion allows the reflowing of content regardless of device (i.e., content will display appropriately on a Kindle, an iPAD, etc., unlike a static file like .pdf). It also allows the simplification of production output by converting to other formats (.pdf, rtf) as desired by the user.

In some embodiments, the system includes essential reading materials (chapters) and other assets (e.g., audio files) that cater to specific learning styles. Based on principles of universal design, the system may encompass alternative materials for students who have disabilities, e.g., visual and neurological impairments. The system may also include a reader that gives students tools to manage their content: not only highlight, notes, and bookmarks, but also a way to organize the content by chapter. And, unlike current versions of Kindle and other readers, the system supports color.

As used herein, the term "set" may refer to any collection of elements, whether finite or infinite. The term "subset" may refer to any collection of elements, wherein the elements are taken from a parent set; a subset may be the entire parent set. The term "proper subset" refers to a subset containing fewer elements than the parent set. The term "sequence" may refer to an ordered set or subset. The terms "less than," "less than or equal to," "greater than," and "greater than or equal to," may be used herein to describe the relations between various objects or members of ordered sets or sequences; these terms will be understood to refer to any appropriate ordering relation applicable to the objects being ordered.

The term "tool" can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 15:
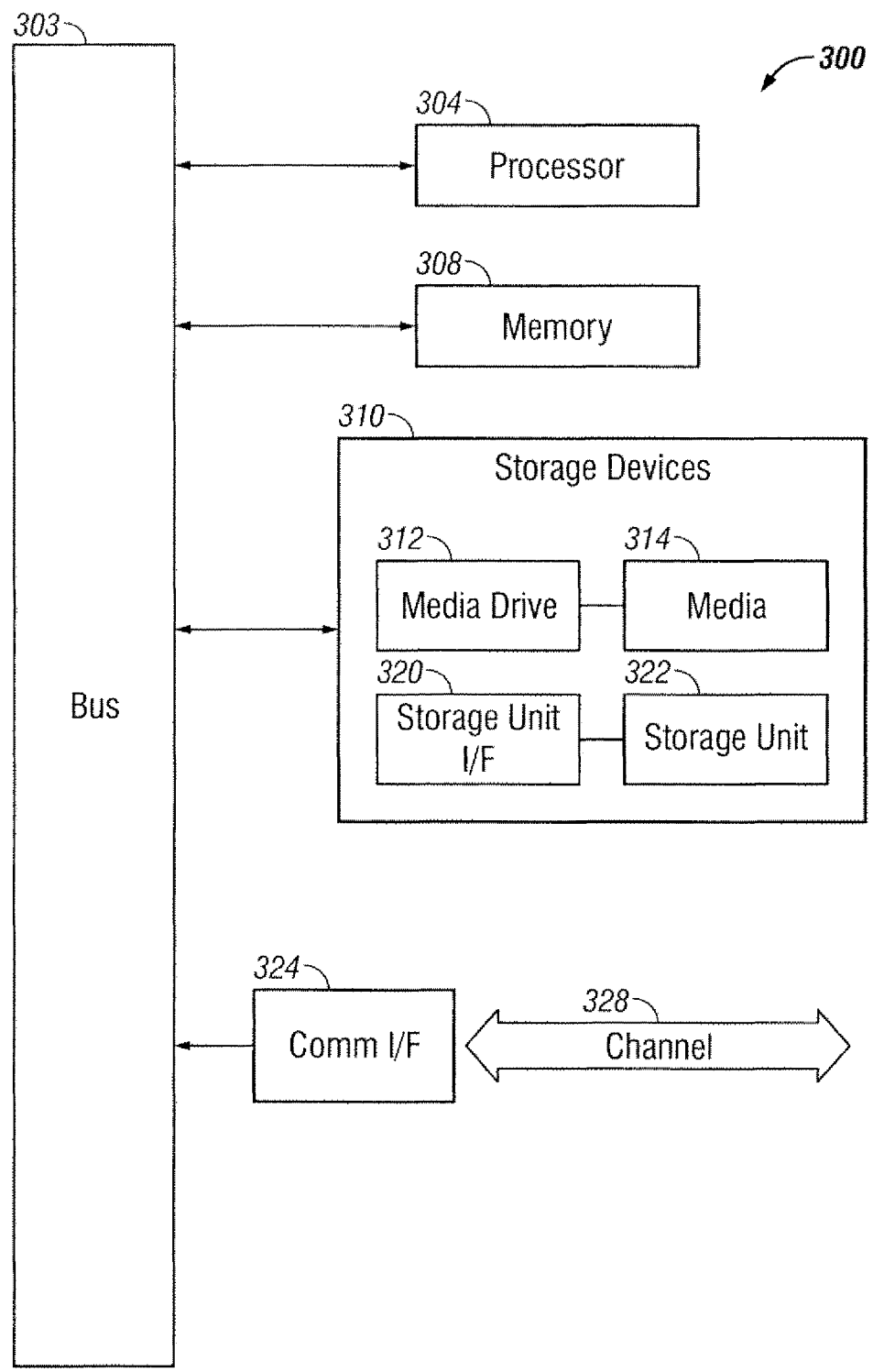
FIG. 15 is a diagram illustrating an example computing module for implementing various embodiments of the invention.

As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 15. Various embodiments are described in terms of this example-computing module 300. After reading this description, it will become apparent to a person skilled in the relevant art how to implement the invention using other computing modules or architectures.

Referring now to FIG. 15, computing module 300 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the illustrated example, processor 304 is connected to a bus 303, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 303 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a floppy disk drive, a magnetic tape drive, an optical disk drive, a CD, DVD or Blu-ray drive (R or RW), or other removable or fixed media drive might be provided. Accordingly, storage media 314 might include, for example, a hard disk, a floppy disk, magnetic tape, cartridge, optical disk, a CD, DVD or Blu-ray, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard,"

"known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system configured to manage annotations made by users to electronic book files, the system comprising:
   one or more physical computer processors configured by computer readable instructions to:
   upload a set of media files and publication requirements by a media publisher for viewing by a plurality of users via a publisher interface on the publisher computing platform, the publication requirements specifying a date and time for publication of the set of media files, wherein a content of at least one media file within the set of media files being in an e-book file format (ePub);
   responsive to a current date and time satisfying the date and time for publication as specified by the publication requirements, publish the set of media files by presenting individual media files in a user interface on a user computing platform, wherein the individual media files are grouped based on the content of the at least one media file within the set of media files;
   obtain user selection of a media file from a first user viewing the set of media files presented in the user interface on the user computing platform operated by the first user;
   map the first user to the selected media file by associating the first user with the selected media file such that the selected media file is marked as being checked out by the first user;
   obtain one or more annotations to the checked-out media file presented within the user interface on the user computing platform operated by the first user, the one or more annotations comprising at least one of a content highlight, a note, and a bookmark entered by the first user;
   generate an annotation summary comprising the one or more annotations associated with the checked-out media file, wherein the first user may interact with the one or more annotations within the checked out media file by a user command effectuated within the annotation summary;
   obtain user selection of a media file from a second user viewing the set of media files presented in a user interface on a user computing platform operated by the second user; and
   share the one or more annotations and comments made by the first user to set of the media files with the second user viewing the set of media files;
   wherein the first and second users manage the one or more annotations within the system via the user interface on the user computing platform operated by the first and second users respectively.

2. The system of claim 1, wherein the management of the one or more annotations effectuated by the user command comprises adding, removing and editing annotations.

3. The system of claim 1, further comprising a reading content module configured for reading content after the first user has been mapped to the content.

4. The system of claim 1, wherein the first user can interact with the annotation summary by searching the annotation summary and viewing the one or more annotations within the content of the checked-out media file.

5. The system of claim 4, wherein the first user selected annotation tool is configured to annotate the content of the checked-out media file by adding highlights, notes and bookmarks to the checked-out media file.

6. The system of claim 1, wherein sharing of the user annotations and comments within the checked-out media file includes making them public by setting sharing properties.

7. The system of claim 6, wherein the sharing properties comprise one or more of audience and permissions.

8. The system of claim 6, wherein the user computing platform comprises the user's PC, an e-book reader device, a handheld phone, or a handheld computer.

9. A system configured to manage permissions based on publication ownership of electronic book files, the system comprising:
   one or more physical computer processors configured by computer readable instructions to:
   upload a set of media files, payment requirements, and publication requirements by a media publisher for viewing by a plurality of users via a publisher interface on the publisher computing platform, the publication requirements specifying a date and time for publication of the set of media files, wherein a content of at least one media file within the set of media files being in an e-book file format (ePub);
   responsive to a payment received from a first user satisfying the payment requirements, and responsive to a current date and time satisfying the date and time for publication as specified by the publication requirements, publish the set of media files by presenting individual media files in a user interface on a user computing platform operated by the first user, wherein the individual media files are grouped based on the content of the at least one media file within the set of media files;
   obtain user selection of a media file from a first user viewing the set of media files presented in the user interface on the user computing platform operated by the first user;
   map the first user to the selected media file by associating the first user with the selected media file such that the selected media file is marked as being checked out by the first user;

present the checked-out media file in the user interface on the user computing platform; and responsive to a payment received from a second user satisfying the payment requirements, and responsive to a current date and time satisfying the date and time for publication as specified by the publication requirements, publish the set of media files by presenting individual media files in a user interface on a user computing platform operated by the second user, wherein the individual media files are grouped based on the content of the at least one media file within the set of media files;

wherein the payment requirements comprise a licensing fee determined by the media publisher.

10. The system of claim 9, wherein the media publisher manages the payment requirements and payments within the system via the publisher interface on the publisher computing platform.

11. The system of claim 9, wherein the publisher interface is integrated with public Representation State Transfer Application Program Interface (RESTful) APis.

12. The system of claim 9, wherein the one or more physical computer processors configured by computer readable instructions to manage the payments by the media publisher by providing a payment term within the system via the publisher interface on the publisher computing platform.

13. The system of claim 11, wherein the payment requirements comprise a licensing fee determined by the media publisher.

14. The system of claim 12, wherein satisfying the payment requirements comprise the fee made by the user satisfying the licensing fee determined by the media publisher.

15. The system of claim 9, further comprising a reading content module configured for reading content after the first user has been mapped to the content.

16. The system of claim 9, wherein the user computing platform comprises the user's PC, an e-book reader device, a handheld phone, or a handheld computer.

* * * * *